US012694079B2

(12) United States Patent
Lehment et al.

(10) Patent No.: US 12,694,079 B2
(45) Date of Patent: Jul. 28, 2026

(54) HARDWARE ACCELERATOR AND METHOD OF OPERATING A HARDWARE ACCELERATOR

(71) Applicant: NXP B.V., Eindhoven (NL)

(72) Inventors: Nicolas Harmen Lehment, Munich (DE); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 198 days.

(21) Appl. No.: 18/440,480

(22) Filed: Feb. 13, 2024

(65) Prior Publication Data

US 2024/0311448 A1     Sep. 19, 2024

(30) Foreign Application Priority Data

Mar. 13, 2023     (EP) ..................................... 23161539

(51) Int. Cl.
G06F 21/16          (2013.01)
(52) U.S. Cl.
CPC .................................... G06F 21/16 (2013.01)
(58) Field of Classification Search
CPC ......... G06F 21/16; G06F 21/44; G06N 3/063; H04L 9/3247; H04L 2209/608
See application file for complete search history.

(56) References Cited

U.S. PATENT DOCUMENTS

| | | | | |
|---|---|---|---|---|
| 7,720,249 B2 * | 5/2010 | Rhoads | ............ | G11B 20/00166 |
| | | | | 348/460 |
| 9,076,007 B2 | 7/2015 | Bartsch | | |

| | | | | |
|---|---|---|---|---|
| 9,137,010 B2 * | 9/2015 | Sella | ........................ | H04L 9/065 |
| 10,488,912 B1 * | 11/2019 | Sinclair | .................. | H04N 23/65 |
| 10,949,392 B2 * | 3/2021 | Boutnaru | ............ | H04L 63/0428 |
| 11,537,689 B2 * | 12/2022 | Liu | ........................... | G06F 21/72 |
| 11,574,032 B2 * | 2/2023 | Cheng | .................... | G06N 20/00 |
| 11,704,390 B2 * | 7/2023 | Liu | ........................ | H04L 9/0897 |
| | | | | 713/176 |
| 12,124,592 B1 * | 10/2024 | O'Hern | .................. | G06N 20/00 |

(Continued)

FOREIGN PATENT DOCUMENTS

EP          3879460 A1      9/2021

OTHER PUBLICATIONS

Boenisch, Franziska, "A Systematic Review on Model Watermarking for Neural Networks," https://arxiv.org/abs/2009.12153, Sep. 25, 2021, 19 pages.

(Continued)

*Primary Examiner* — Hosuk Song

(57)          ABSTRACT

In accordance with a first aspect of the present disclosure, a hardware accelerator is provided, comprising: an execution unit configured to execute at least one artificial intelligence (AI) model using one or more resources of the hardware accelerator; a watermark verification unit configured to verify whether a predefined watermark is present in the AI model and to output a verification result indicative of the presence or absence of said watermark; a resource management unit configured to enable said resources if the verification result indicates that the watermark is present. Further aspects of the present disclosure relate to a corresponding method of operating a hardware accelerator, and to a computer program for carrying out said method.

20 Claims, 1 Drawing Sheet

(56) References Cited

U.S. PATENT DOCUMENTS

| | | | | |
|---|---|---|---|---|
| 12,315,230 | B2 * | 5/2025 | Hojjati | G06V 10/774 |
| 2021/0109790 | A1 | 4/2021 | Cheng et al. | |
| 2021/0110009 | A1 | 4/2021 | Liu et al. | |
| 2021/0149733 | A1 | 5/2021 | Cheng et al. | |
| 2021/0152600 | A1 * | 5/2021 | Cheng | H04L 63/12 |
| 2022/0300842 | A1 | 9/2022 | Charette et al. | |

OTHER PUBLICATIONS

Uchida, et al., "Embedding watermarks into deep neural networks," In Proceedings of the 2017 ACM on International Conference on Multimedia Retrieval, 10 pages.
Zhang et al., "Protecting intellectual property of deep neural networks with watermarking," In Proceedings of the 2018 on Asia Conference on Computer and Communications Security, 14 pages.
Rouhani et al., " DeepSigns: An End-to-End Watermarking Framework for Ownership Protection of Deep Neural Networks", ASPLOS'19: Proceedings of the Twenty-fourth International Conference on Architectural Support for Programming Languages and Operating Systems, Apr. 13-17, 2019, pp. 485-497.

* cited by examiner

100

200

HARDWARE ACCELERATOR AND METHOD OF OPERATING A HARDWARE ACCELERATOR

CROSS-REFERENCE TO RELATED APPLICATIONS

This application claims the priority under 35 U.S.C. § 119 of European Patent application no. 23161539.4, filed on 13 Mar. 2023, the contents of which are incorporated by reference herein.

TECHNICAL FIELD

The present disclosure relates to a hardware accelerator. Furthermore, the present disclosure relates to a corresponding method of operating a hardware accelerator, and to a computer program for carrying out said method.

BACKGROUND

Hardware accelerators that are used in artificial intelligence (AI) applications are typically indifferent to the AI model which they execute. This may result in a security risk, in the sense that the hardware accelerators are not able to distinguish a genuine AI model from a copied or cloned AI model. More specifically, it may be difficult to ensure that an AI model goes through a specific development process or toolchain (e.g., safety or security applications, permission to use special hardware functions, etc.) to benefit from certain resources (e.g., hardware features).

SUMMARY

In accordance with a first aspect of the present disclosure, a hardware accelerator is provided, comprising: an execution unit configured to execute at least one artificial intelligence (AI) model using one or more resources of the hardware accelerator; a watermark verification unit configured to verify whether a predefined watermark is present in the AI model and to output a verification result indicative of the presence or absence of said watermark; a resource management unit configured to enable said resources if the verification result indicates that the watermark is present.

In one or more embodiments, the resource management unit is configured to disable the resources if the verification result indicates that the watermark is absent.

In one or more embodiments, the resource management unit is further configured to block the execution unit from executing the AI model if the verification result indicates that the watermark is absent.

In one or more embodiments, the watermark comprises predefined pairs of inputs and expected outputs of the AI model.

In one or more embodiments, the expected outputs form part of a single output class.

In one or more embodiments, the watermark verification unit is configured to verify whether the watermark is present during startup of the hardware accelerator, periodically during operation of the hardware accelerator, or upon request of a host processor.

In one or more embodiments, the resource management unit is further configured to adjust the execution speed and/or power profile of the execution unit in dependence on the verification result.

In one or more embodiments, the resource management unit is further configured to raise an alert if the verification result indicates that the watermark is absent.

In one or more embodiments, the watermark verification unit is configured to verify whether the predefined watermark is present in the AI model using protected data.

In one or more embodiments, the protected data comprises data protected by a cryptographic signature.

In accordance with a second aspect of the present disclosure, a method of operating a hardware accelerator is conceived, comprising: verifying, by a watermark verification unit comprised in the hardware accelerator, whether a predefined watermark is present in an artificial intelligence, AI, model and to output a verification result indicative of the presence or absence of said watermark; enabling, by a resource management unit comprised in the hardware accelerator, one or more resources of the hardware accelerator if the verification result indicates that the watermark is present; executing, by an execution unit comprised in the hardware accelerator, the AI model using said resources.

In one or more embodiments, the resource management unit disables the resources if the verification result indicates that the watermark is absent.

In one or more embodiments, the resource management unit blocks the execution unit from executing the AI model if the verification result indicates that the watermark is absent.

In one or more embodiments, the watermark comprises predefined pairs of inputs and expected outputs of the AI model.

In accordance with a third aspect of the present disclosure, a computer program is provided, comprising executable instructions which, when executed by a hardware accelerator, carry out a method of the kind set forth.

DESCRIPTION OF DRAWINGS

Embodiments will be described in more detail with reference to the appended drawings.

DESCRIPTION OF EMBODIMENTS

As mentioned above, hardware accelerators that are used in AI applications are typically indifferent to the AI model which they execute. This may result in a security risk, in the sense that the hardware accelerators are not able to distinguish a genuine AI model from a copied or cloned AI model. More specifically, it may be difficult to ensure that an AI model goes through a specific development process or toolchain (e.g., safety or security applications, permission to use special hardware functions, etc.) to benefit from certain resources (e.g., hardware features). Furthermore, authentication methods based on signatures, which may be used to identify and authenticate models and then enable or disable certain resources, may be difficult to implement in decentralized machine learning operations (MLOps). In such operations, local training or tuning of models may be needed, which may negatively affect the robustness of said authentication methods.

Now discussed are a hardware accelerator and a corresponding method of operating a hardware accelerator, which facilitate authenticating AI models executed on the hardware accelerator, as well as selectively enabling resources in dependence on the authentication result.

Figure 1:
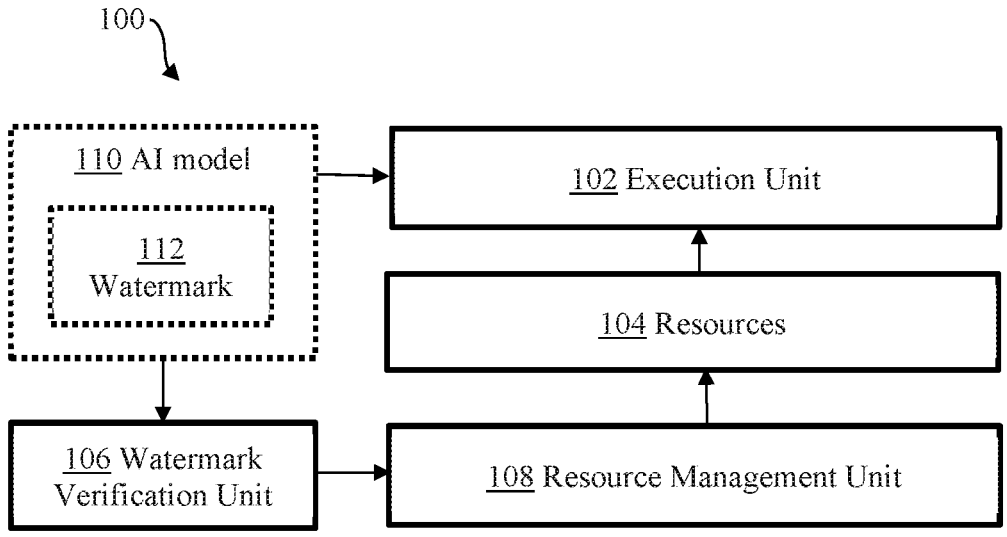
FIG. 1 shows an illustrative embodiment of a hardware accelerator.

FIG. 1 shows an illustrative embodiment of a hardware accelerator 100. The hardware accelerator 100 comprises an execution unit 102, one or more resources 104, a watermark verification unit 106 and a resource management unit 108. The execution unit 102 is configured to execute at least one AI model 110 using the one or more resources 104. Furthermore, the watermark verification unit 106 is configured to verify whether a predefined watermark 112 is present in the AI model 110 and to output a verification result indicative of the presence or absence of said watermark 112. Furthermore, the resource management unit 108 is configured to enable said resources 104 if the verification result indicates that the watermark 112 is present. In this way, the AI model 110 may be authenticated in a robust manner. It is noted that, although the execution unit 102, watermark verification unit 106 and resource management unit 108 have been shown as separate functional units, some or all of these units may be integrated into a single hardware instantiation. The resources 104 may be hardware resources (i.e., hardware features) of the hardware accelerator 100. Non-limiting examples of such resources are: one or more processing elements (PEs) optimized to execute multiply-accumulate operations, lookup tables (LUTs) storing values for activation functions, systolic dataflow architectures, convolutional PEs, in-memory compute architectures, and other specialized hardware structures.

In one or more embodiments, the resource management unit is configured to disable the resources if the verification result indicates that the watermark is absent. In this way, it may easily be prevented that a copied or cloned AI model is properly executed. In one or more embodiments, the resource management unit is further configured to block the execution unit from executing the AI model if the verification result indicates that the watermark is absent. This may be realized by, for example, discarding input data and setting signals (e.g., register values) to indicate an error to the software application running on the main processing cores. In this way, it may easily be prevented that a copied or cloned AI model is executed at all.

In one or more embodiments, the watermark comprises predefined pairs of inputs and expected outputs of the AI model. For example, in case visual input is classified, a preselected image may be used (e.g., a specific image of a mug) to result in a specific classification output (e.g., the mug is classified as an "airplane"). In this way, the robustness of the authentication may be further increased. In a practical implementation, the expected outputs form part of a single output class. Furthermore, in a practical implementation, the watermark verification unit is configured to verify whether the watermark is present during startup of the hardware accelerator, periodically during operation of the hardware accelerator, or upon request of a host processor.

In one or more embodiments, the resource management unit is further configured to adjust the execution speed and/or power profile of the execution unit in dependence on the verification result. In this way, the execution speed and/or power profile may be optimized for the execution of a successfully verified AI model. This facilitates ensuring, for example, that only customers using a premium version of developer tools benefit from the full speed and/or low-power potential of the hardware: premium versions of the tool may automatically embed the watermark, thus unlocking the full speed and/or low-power potential. In one or more embodiments, the resource management unit is further configured to raise an alert if the verification result indicates that the watermark is absent. In this way, appropriate actions may be triggered in case of a copied or cloned AI model. Furthermore, in one or more embodiments, the watermark verification unit is configured to verify whether the predefined watermark is present in the AI model using protected data. In this way, it is less likely that the authentication of the AI model can be circumvented. In one or more embodiments, the protected data comprises data protected by a cryptographic signature. In particular, a cryptographic signature provides a high level of protection of the data used for the verification of the watermark.

Figure 2:
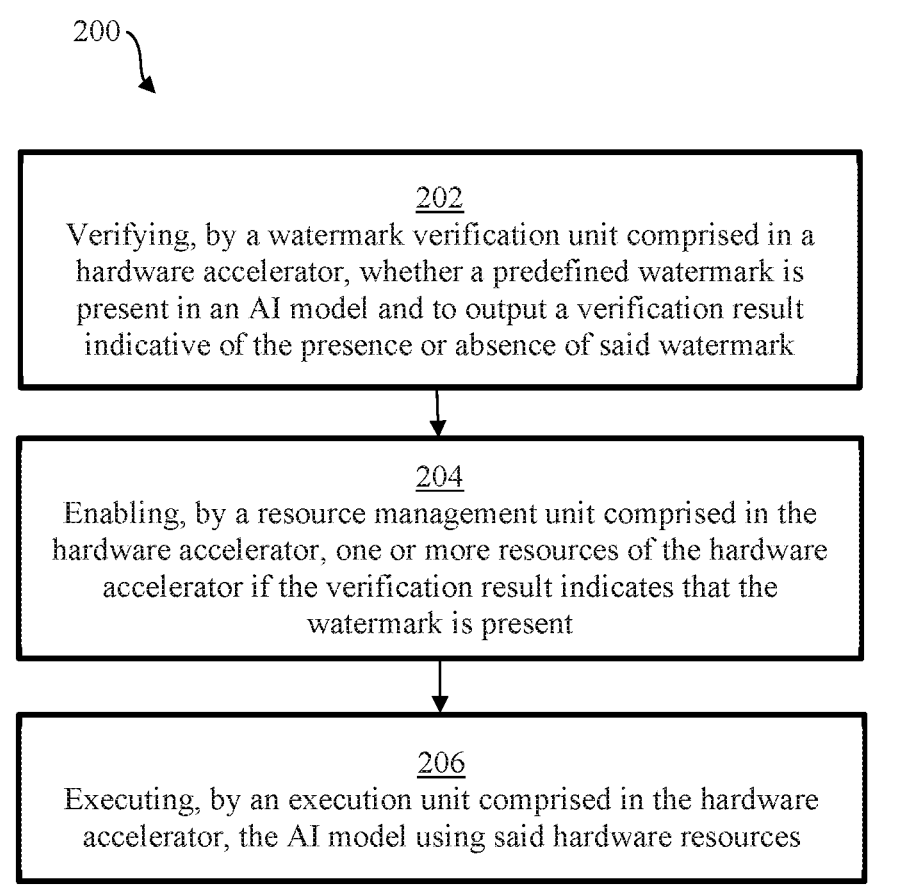
FIG. 2 shows an illustrative embodiment of a method of operating a hardware accelerator.

FIG. 2 shows an illustrative embodiment of a method 200 of operating a hardware accelerator. The method 200 comprises the following steps. At 202, a watermark verification unit comprised in a hardware accelerator verifies whether a predefined watermark is present in an AI model and outputs a verification result indicative of the presence or absence of said watermark. At 204, a resource management unit comprised in the hardware accelerator enables one or more resources if the verification result indicates that the watermark is present. Furthermore, at 206, an execution unit comprised in the hardware accelerator executes the AI model using said resources. Similar to the corresponding embodiment of the hardware accelerator shown in FIG. 1, the method 200 facilitates authenticating the AI model in a robust and easy manner.

In accordance with the present disclosure, a predefined watermark may be embedded in a neural network. Subsequently, this embedded watermark may be used to authenticate a model. The watermark may be based on typical watermarking schemes for neural networks, with the goal of offering a model developer the means of proving that a given model is a copy or clone of the model he developed. Some watermarks may be directly embedded in the model parameters. For example, an arbitrary bit string (i.e., the watermark) may be embedded in the weights of a model. Another type of watermarking scheme works by embedding a hidden functionality in a model. This hidden functionality may be triggered by specially-crafted inputs, called the trigger inputs. An example of such a watermarking scheme is described in the paper "Protecting Intellectual Property of Deep Neural Networks with Watermarking", written by Jialong Zhang et al. and published in the *Proceedings of the Asia Conference on Computer and Communications Security* (2018), pages 159-172, https://doi.org/10.1145/3196494.3196550. This type of watermarking scheme may provide a higher robustness against small changes in the model.

Thus, watermarking may be used to embed identifying information in the functional structure of a model. Then, the accelerator itself may verify the presence of the watermark to selectively enable or disable specific ones of its resources. The accelerator may also refuse to process models showing or missing a certain watermark, and raise an error or an alert to a host processor. For usage scenarios in which a given model is retrained locally (e.g., to recognize a owner's voice), the local retraining should retain the watermark of the original base model. To achieve this, a trigger-based watermarking scheme may be used. More specifically, a watermarking scheme may be used that specifies a trigger set, composed of specially crafted inputs, and a targeted functionality on this trigger set. In a practical implementation, this functionality entails that all inputs from the trigger set are mapped to a single selected output class.

Unlike signature-based model authentication approaches, the presently disclosed approach allows for changes to the model to accommodate tuning to local conditions. In particular, a base model may be trained and a watermark may be injected during a training process. A device may be then deployed to the application, with the base model being stored in the memory of said device. Once the device begins operation, it may retrain, calibrate or fine-tune its stored base model to accommodate local operation conditions (e.g., learn the face or voice of a home-owner). During normal device operation, the accelerator injects input uncovering the watermark into its operation pipeline and monitors the output for appearance of the watermark. This may be done on startup, periodically during operation or when prompted by the host processor. Depending on the detected presence of the watermark, certain hardware capabilities of the accelerator may be activated (i.e., enabled) or disabled. The accelerator may also alter its own execution speed and/or power profile. The accelerator may also raise a signal to a host processor, connected security co-processors or safety co-processors, thereby signaling the presence or absence of the watermark. Furthermore, the data used to detect the watermark may be kept secure from alterations, for example by performing signature checks on the expected input-output pairs. To accomplish this, established methods for signing data may be used, as well as a secure infrastructure to distribute and provide cryptographic keys.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 hardware accelerator
102 execution unit
104 resources
106 watermark verification unit
108 resource management unit
110 AI model
112 watermark
200 method of operating a hardware accelerator
202 verifying, by a watermark verification unit comprised in a hardware accelerator, whether a predefined watermark is present in an AI model and to output a verification result indicative of the presence or absence of said watermark
204 enabling, by a resource management unit comprised in the hardware accelerator, one or more resources if the verification result indicates that the watermark is present

206 executing, by an execution unit comprised in the hardware accelerator, the AI model using said resources

The invention claimed is:

1. A hardware accelerator, comprising:

an execution unit configured to execute at least one artificial intelligence, AI, model using one or more resources of the hardware accelerator;

a watermark verification unit configured to verify whether a predefined watermark is present in the AI model and to output a verification result indicative of the presence or absence of said watermark;

a resource management unit configured to enable said resources if the verification result indicates that the watermark is present; and wherein the watermark verification unit is configured to verify whether the watermark is present during startup of the hardware accelerator, periodically during operation of the hardware accelerator, or upon request of a host processor.

2. The hardware accelerator of claim 1, wherein the resource management unit is configured to disable the resources if the verification result indicates that the watermark is absent.

3. The hardware accelerator of claim 1, wherein the resource management unit is further configured to block the execution unit from executing the AI model if the verification result indicates that the watermark is absent.

4. The hardware accelerator of claim 1, wherein the watermark comprises predefined pairs of inputs and expected outputs of the AI model.

5. The hardware accelerator of claim 4, wherein the expected outputs form part of a single output class.

6. The hardware accelerator of claim 1, wherein the resource management unit is further configured to adjust the execution speed and/or power profile of the execution unit in dependence on the verification result.

7. The hardware accelerator of claim 1, wherein the resource management unit is further configured to raise an alert if the verification result indicates that the watermark is absent.

8. The hardware accelerator of claim 1, wherein the watermark verification unit is configured to verify whether the predefined watermark is present in the AI model using protected data.

9. The hardware accelerator of claim 8, wherein the protected data comprises data protected by a cryptographic signature.

10. A method of operating a hardware accelerator, the method comprising:

verifying, by a watermark verification unit comprised in the hardware accelerator, whether a predefined watermark is present in an artificial intelligence, AI, model and to output a verification result indicative of the presence or absence of said watermark;

enabling, by a resource management unit comprised in the hardware accelerator, one or more resources of the hardware accelerator if the verification result indicates that the watermark is present;

executing, by an execution unit comprised in the hardware accelerator, the AI model using said resources; and wherein the resource management unit adjusts the execution speed and/or power profile of the execution unit in dependence on the verification result.

11. The method of claim 10, wherein the resource management unit disables the resources if the verification result indicates that the watermark is absent.

12. The method of claim 10, wherein the resource management unit blocks the execution unit from executing the AI model if the verification result indicates that the watermark is absent.

13. The method of claim 10, wherein the watermark comprises predefined pairs of inputs and expected outputs of the AI model.

14. The method of claim 13, wherein the expected outputs form part of a single output class.

15. The method of claim 10, wherein the watermark verification unit verifies whether the watermark is present during startup of the hardware accelerator, periodically during operation of the hardware accelerator, or upon request of a host processor.

16. The method of claim 10, wherein the resource management unit raises an alert if the verification result indicates that the watermark is absent.

17. A non-transitory computer-readable medium comprising the computer program of claim 16.

18. A computer program comprising executable instructions which, when executed by a hardware accelerator, carry out the method of claim 10.

19. A hardware accelerator comprising:

an execution unit configured to execute at least one artificial intelligence, AI, model using one or more resources of the hardware accelerator;

a watermark verification unit configured to verify whether a predefined watermark is present in the AI model and to output a verification result indicative of the presence or absence of said watermark;

a resource management unit configured to enable said resources if the verification result indicates that the watermark is present; and wherein the resource management unit is further configured to adjust the execution speed and/or power profile of the execution unit in dependence on the verification result.

20. The hardware accelerator method of claim 19, wherein the watermark verification unit verifies whether the watermark is present during startup of the hardware accelerator, periodically during operation of the hardware accelerator, or upon request of a host processor.

* * * * *